United States Patent [19]
Kyle et al.

[11] 3,748,032
[45] July 24, 1973

[54] MICROFORM VIEWER INDEXING MEANS

[75] Inventors: Thomas A. Kyle, Bellbrook; Walter L. Schutrum, Kettering, both of Ohio

[73] Assignee: The National Cash Register Company, Dayton, Ohio

[22] Filed: Mar. 23, 1971

[21] Appl. No.: 127,145

[52] U.S. Cl. ................................................. 353/27
[51] Int. Cl. ........................................... C03b 23/08
[58] Field of Search .................. 353/25, 26, 27, 74, 353/75, 76, 77, 78

[56] References Cited
UNITED STATES PATENTS

| 3,560,083 | 2/1971 | Brownscombe | 353/27 |
| 3,509,651 | 5/1970 | Robbins | 353/27 |

FOREIGN PATENTS OR APPLICATIONS

| 942,117 | 1/1949 | France | 353/27 |
| 1,430,277 | 1/1966 | France | 353/27 |

OTHER PUBLICATIONS
Selection Indicator for Fiche Viewer, O. Nielsen, Vol. 10, No. 12, May 1968.

Primary Examiner—Louis R. Prince
Assistant Examiner—A. J. Mirabito
Attorney—Louis A. Kline, Wilbert Hawk, Jr. and George J. Muckenthaler

[57] ABSTRACT

Means for indication of column and row positions of microform images in a viewer or reader to assure a rapid accessibility to microform data. In a microform system having a form carrier for placing the data images in position for projection, the carrier being linked to indexing means so that the image being viewed by the user can be identified as to its column and row designation. An indexing roller device containing the column and row designations is rotated by movement of the microform carrier in a fore or aft direction for indication of the row, and movement of the carrier in a left or right direction provides indication of the column in a conveniently placed window.

1 Claim, 5 Drawing Figures

Patented July 24, 1973

INVENTORS
THOMAS A. KYLE &
WALTER L. SCHUTRUM

BY

THEIR ATTORNEYS

Patented July 24, 1973 3,748,032
2 Sheets-Sheet 2
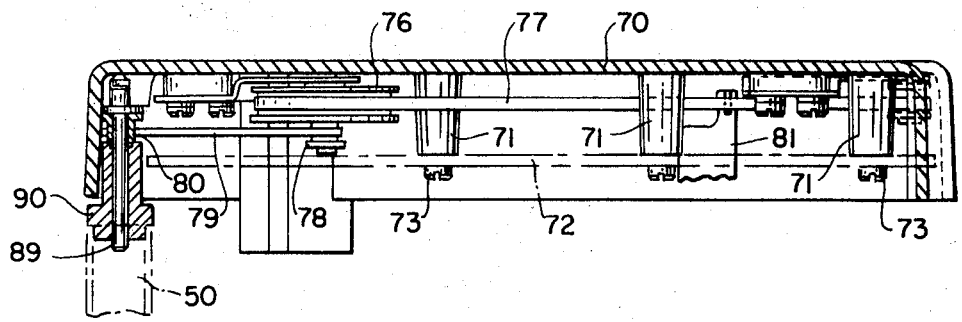
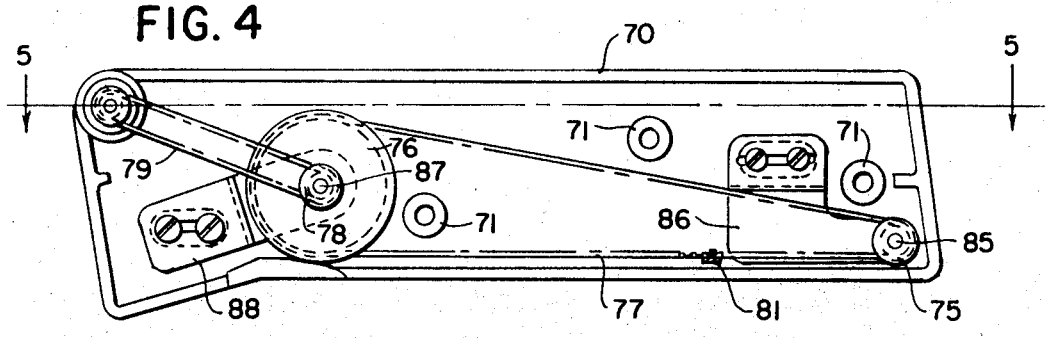
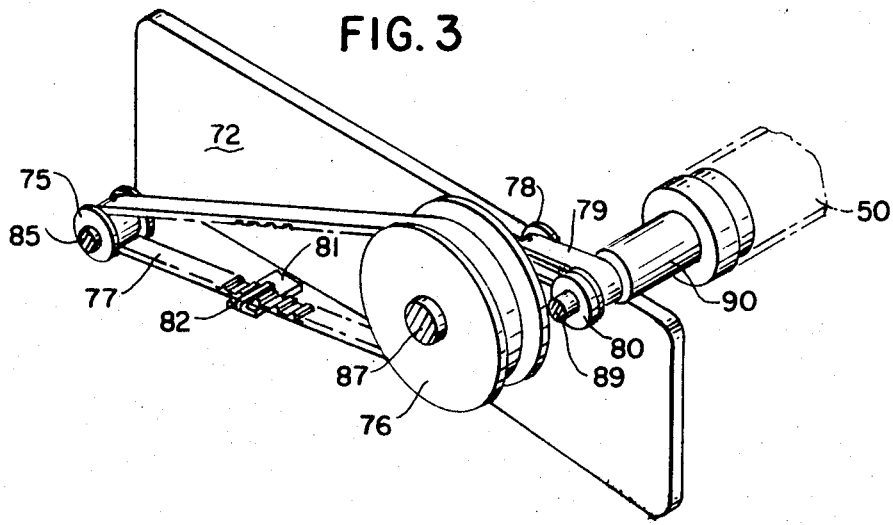
INVENTORS
THOMAS A. KYLE &
WALTER L. SCHUTRUM
BY Louis A. Kline
Wilbert Hawk, Jr.
Geo. J. Muckenthaler
THEIR ATTORNEYS

MICROFORM VIEWER INDEXING MEANS

BACKGROUND OF THE INVENTION

With the advent of smaller business equipment, the microform reader or viewer is destined to fall within such a group for reasons of compactness and portability. As is well known, the data carried in microform manner, such as micorfilm or microfiche, enables and provides a very minimum of surface area for storage of an immense amount of data, so it is preferred that the equipment operated for retrieval of such data be compatible with the film or fiche in the matter of occupying minimum space.

One of the desirable features in a microform viewer or reader is the provision of means for determining the location or position of certain or specific data contained on the film or fiche. Since the data on the form cannot be read without the use of a reader or viewer, it is desirable to have made known the location of such specific data without searching over a portion of the form by trial-and-error method.

A common method of displaying or indicating to the equipment operator the location of a desired microform image has been the provision of an index plate or grid carried on a projecting member of the reader or viewer base, and a pointer fixed or secured to the microform carrier for the purpose of selecting the pointed index and matching it with the desired image to be read from the microform, the pointer being manually moved by the operator to the selected grid of the index plate. Such construction is shown and described in a copending U.S. Pat. application, Ser. No. 851,858, filed Aug. 21, 1969, now U.S. Pat. No. 3,634,005 on the invention of Arnis E. Peters and Lyle G. Miles, which application is assigned to the same assignee as the application of the present invention. As readily observed from the drawings in said copending United States patent application, both members, including the index plate or grid and the pointer, project a distance forwardly at the front of the reader and therefore occupy valuable space in an area where it is desirable to operate a compact machine.

SUMMARY OF THE INVENTION

The present invention relates to microform readers of the microfiche transparent-image type and more particularly to an indexing means for indicating column and row positions of the microform images. The transparency carrier, which includes an upper glass plate and a lower galss plate, which contain the microform therebetween, is movable by the operator in a side-to-side direction or in a fore-and-aft direction to select the microimage to be read or viewed. The transparency or microform carrier has a frame for supporting the glass plates and a handle for use by the operator for directing movement of the microform to a desired location. Connected to the carrier frame is an arm or link which extends and is connected to a belt carried around pulleys journaled at one side of the microform carrier. One of the pulley shafts includes a gear which meshes with an intermediate gear, in turn meshing with a driven gear at the forward area of the reader. An indexing roller is connected to hubs carried by side plates adjacent the carrier, and the roller includes column and row designations on its periphery, such designations ocrresponding to coordinates of the locations of images on the microform. A window secured to the reader and in front of the roller displays one of the column and row coordinates at any given time to indicate to the operator the specific location of a desired image. As the microform carrier is moved, the coordinates appear in the window and thus provide the operator with a positive means for indication and for positioning an image to be viewed in the shortest possible time. Right and left motion of the carrier moves the indexing roller, without rotation thereof, past the window to indicate the proper column coordinate. Fore and aft motion of the carrier moves the indexing roller, in rotary motion, past the window to indicate the proper row coordinate. A modified drive means for the indexing roller utilizes a pair of belts, one belt carrying the arm or link, and the other belt connecting the first belt drive and the roller.

With the above discussion, the principal object of the present invention is to provide a microform reader with improved means for indication of the column and row position of a desired image.

Another object of the present invention is to provide a microform reader with column and row indicating means assuring a rapid accessiblity to microform data.

An additional object of the present invention is to provide single location indexing means for the operator to use as a reference for positioning image information.

A further object of the present invention is to provide indexing means in a frontal location on the reader to permit convenience of viewing the image and the index position.

Still a further object of the present invention is to provide a replaceable indexing roller which, when matched with an appropriate microform and projection lens, features a readily changeable indexing system.

And still another object of the present invention is to provide indexing means which, with knowledge of the desired image column and row designation, enables the operator to pre-position to that location indicated on the index roller and therefore to view the image immediately.

Additional advantages and features of the present invention will become readily apparent and fully understood from a reading of the following description taken together with the annexed drawings, in which:

FIG. 3 is a perspective view showing a modified drive for the indexing means;

FIG. 4 is a side elevational view of the modified drive as viewed from the rear in FIG. 3, absent the outer rail 72 and including an outer support casting and cover member for the drive; and FIG. 5 is a top plan view, in section, of the modified drive as taken on the line 5—5 of FIG. 4.

Figure 1:
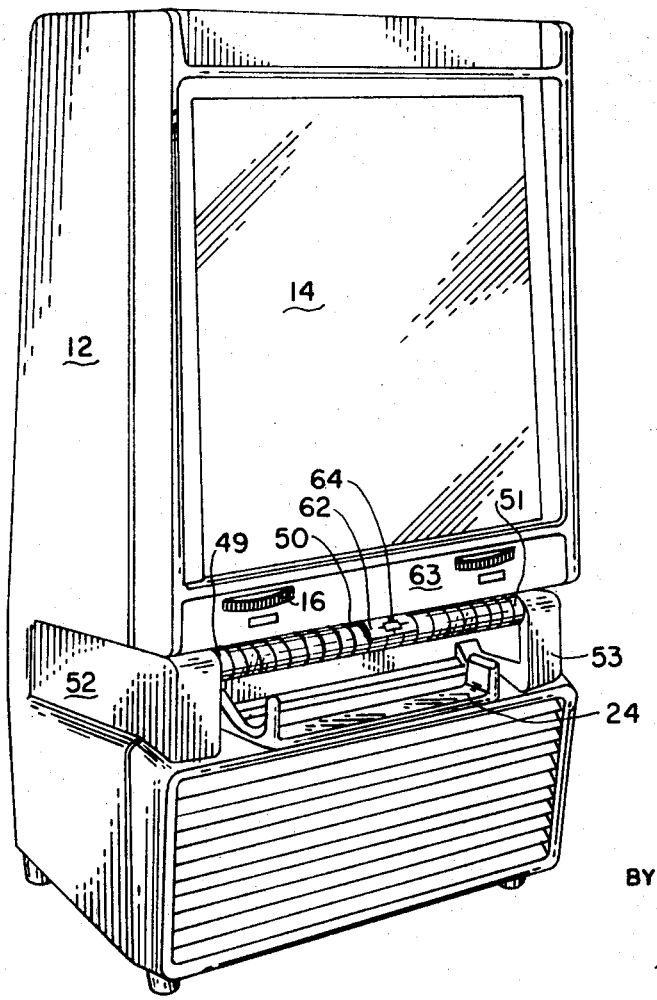
FIG. 1 is a front perspective view of a microform reader incorporating the structure of the present invention.

Referring to FIG. 1, a microform reader or viewer of the portable type includes a housing 12 of generally rectangular box shape to contain the working parts of the reader. As is well known, a microform reader basically has a microform image holder or carrier, a projection lens and optical system, and a screen for viewing the enlargement of the microimage. The details of the projection lens and optical system are not shown, as they form no part of the present invention; however, suffice it to say that the optical system includes a source of light, the projection lens, and the required mirrors to direct the projected image from the film or transparency along a path onto the screen 14. An on-off switch 16 is conveniently located to be operated by the user of the reader. As is also well known, the microforms veiwed with a reader of this type are in the nature of cards, sheets, or the like containing information from a plurality of pages of information in the form of reduced images, so that a single card or sheet may contain 75 to 100 or more of such reduced images, depending upon the size of the card and the reduction ratio thereof. In the present invention, a typical card or sheet having 84 such reduced images thereon will be described as exemplary of these microforms.

Provision is made in the reader to load and unload the microform selected to be read, and this generally is in the nature of a carrier (FIG. 2) which is drawn forwardly, or toward the operator, to insert the form and then is pushed rearwardly to position the form for reading, after which the carrier is again pulled forwardly to remove the microform therefrom. In the instant invention, the carrier comprises a framework 19 for supporting a lower transparent plate 20, an upper transparent plate 22, and a handle 24 for use by the operator in moving the carrier to the desired fore-and-aft and side-to-side positions, the microform 26 being shown in grid manner and nestled between the transparent plates 20 and 22. The handle 24 is, in effect, an extension of the carrier framework 19, so that the carrier itself is movable as a unit in the required directions to position the microform in the desired location for viewing a selected image thereon.

Secured to the framework 19, at its left side (FIG. 2), is an extension or arm 30, which is connected to an endless belt 32 trained around a rear pulley 34 journaled on a pin 36 secured to a side frame plate 38, then trained around a second pulley 40, forward of the pulley 34 and journaled on a pin 41 secured to the plate 38, and finally around a third pulley 42 journaled on a pin 43 upward from the pin 41, the pin 43 also carrying a drive gear 44 engaging with an intermediate gear 45, in turn engaging with a driven gear 46. The intermediate gear 45 is journaled on a pin 47 of the plate 38, and the driven gear 46 is secured to a shaft 48, which extends through the plate 38 and which rotates a hub 49 positioned on the opposite side of the plate 38 from the gears 44, 45, and 46.

An indexing roll or roller 50 is supported from and is carried by the rotatable hub 49 at one end thereof and similarly carried by another hub 51 (FIG. 1) at the opposite, or right, end thereof, it being understood from FIGS. 1 and 2 that the roller 50 extends across the front of the reader below the screen 14 and above the microform carrier framework 19. On the outer sides of the microform carrier and enclosing the side frame plates 38, there also being a right-hand such plate (not shown), are covers 52 and 53 to provide protection for the various moving parts located at the sides of the carrier and also to present a pleasing appearance to such carrier.

Figure 2:
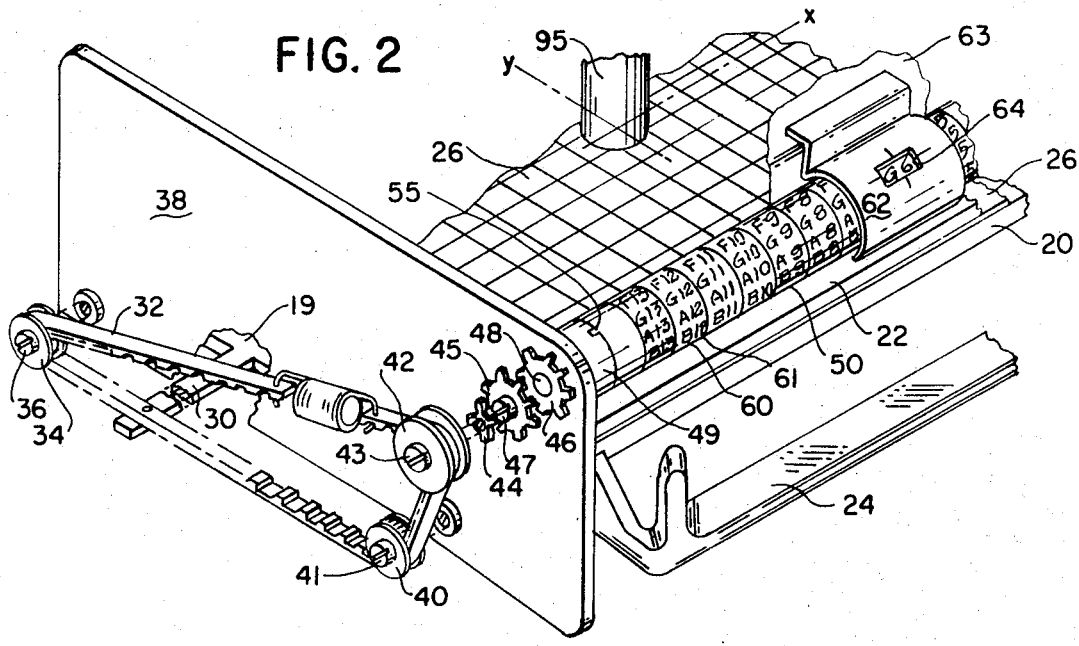
FIG. 2 is a perspective view of the indexing means and shows one form of drive therefor.

As seen in FIG. 2, the roll or roller 50 is a cylindrical tube, preferably of a plastic material, and includes a series of letters 60 and numbers 61 etched or scribed or otherwise appearing on its exterior surface, these letters and numbers being so placed on the roller as to form coordinates representative of and corresponding to the coordinates assigned to and occupied by the reduced images on the microform 26. The 84 images, mentioned above, are made up of the letters A to G and the numbers 1 to 12, as representatively indicated on the roller 50. Partially encircling an upper front portion of the roller 50 is a curved member 62 centrally secured to a frontal portion 63 of the reader enclosure and having therein a small window 64 for displaying coordinates on the roller, the coordinates G6 being displayed for the purpose of illustration in FIG. 2. It is thus seen that, as the microform carrier, by means of the handle 64, is moved laterally, or in a side-to-side direction, the roller 50 moves axially along the curved member 62, and successive column coordinates are displayed in the window 64. It should be noted that the parts which move laterally include the microform carrier framework 19, the transparent plates 20 and 22, the handle 24, which initiates and propels movement of the parts, the side frame plates 38 with the attached drive belt and pulleys, the outer covers 52 and 53, and, of course, the microform 26, clamped between the transparent plates 20 and 22.

When the handle 24 is pulled outwardly, or toward the front of the reader, the carrier framework 19, with the transparent plates 20 and 22, moves forwardly, and, since the framework 19 is connected to the belt 32 by the arm 30, this force likewise initiates movement of the belt 32, the pulleys 34, 40, and 42, and the gears 44, 45, and 46, and, in turn, rotates the indexing roller 50. It is thus seen that movement of the microform carrier framework 19 in the fore-and-aft direction rotates the roller 50 to present a successive display of row coordinates in the window 64.

Through either side-to-side, fore-and-aft, or a combination of such movements of the microform carrier, the particular microimage on the microform 26 desired to be viewed can be moved directly into alignment for enlargement on the reader screen 14 through providing the coordinates thereof within the window 64 of the curved member 62.

Referring now to FIGS. 3, 4, and 5, there is shown a modified form, which utilizes two belts instead of the one belt and associated gears, as described above. As will be recalled from FIGS. 1 and 2, the left side frame plate 38 supports the various pins 36, 41, and 43 for the pulleys and gears, and the cover 52 encloses such plate and the overall roller drive means. It has been found that the side plate, the particular drive, and the cover can be incorporated into simpler mechanism with at least comparable performance by the construction shown in FIGS. 3, 4, and 5. A formed casting 70, in the general shape of a rectangular pan, carries a plurality of bosses 71 for use in securing the casting to an outer rail 72 or similar support member by means of screws 73. In this construction, the outer rail 72, with the casting 70 and the drive means, is movable in side-to-side direction, while allowing the microform carrier framework, with the glass plates thereon, to move in a fore-and-aft direction and supported from an inner rail (not shown). Suffice it to say that cooperative inner and outer rail construction is well known for fore-and-aft movement of the glass plates 20, 22 containing the microform 26 in relation to supporting side structure of the reader.

As shown in FIG. 3, the drive for the index roller 50 comprises a small index pulley 75 journaled at the rear of the reader, a large index pulley 76 journaled forwardly thereof along the side of the outer rail 72, a belt 77 trained around these pulleys 75 and 76, a small pulley 78 in axial alignment with the large pulley 76, and a belt 79 trained around the small pulley 78 and a driven pulley 80 axially aligned with the indexing roller 50. An extension or arm 81 is secured to the microform carrier framework 19 and is connected to the belt 77 by means of turning over an end portion 82 of such extension 81 in a groove in the belt to provide a secure connection and to insure timed rotation of the indexing roller 50 with the coordinates on the microform 26.

FIGS. 4 and 5 show the detailed construction of the roller 50 modified drive, wherein the pulley 75 is carried on a shaft 85 journaled in a small pulley bracket 86 on the casting 70. The pulleys 76 and 78 are carried on a shaft 87 journaled in a large pulley bracket 88 on the casting 70, and the pulley 80 is carried on an index stud or shaft 89, in turn driving an index hub 90 supporting one end of the roller 50. The brackets 86 and 88 are adjustable by means of suitable screw-and-slot connections, shown best in FIG. 4, for the purpose of maintaining proper tension on the belts 77 and 79 and to initially time and maintain timing of the belt drive and the indexing roller with the coordinates on the microform.

A glance at the window 64 (FIG. 1) immediately shows the operator on which coordinates the microform carrier is positioned and also informs him of the direction or directions in which to move the carrier as determined by his knowledge of the matter on the microform. Such movement may, of course, be side-to-side, fore-and-aft, or diagonal as the situation requires to go directly to the desired coordinates. Since various microform cards or sheets may be of different sizes and also have different reduction ratios, the number of images contained thereon may vary according to the size of the card and also the reduction ratio of the images thereon may vary, but will normally closely correspond to the reduction ratio of the reader, so that an operator can become proficient in quickly locating a certain area on the microform after some usage of the reader. Another feature of the invention is the use of different scales and ratios on the indexing roller 50; in effect, a plurality of different such rollers 50 may be used in a certain reader to utilize different reduction ratio microforms. The indexing roller 50 and the hub 49 of FIGS. 1 and 2 include at least one tooth-and-slot connection 55 for presenting and maintaining the roller in timed relationship with the drive when changing rollers. When the format of a microform is generally known, it is possible to insert the form into the carrier and to move the carrier to display coordinates in the window 64 of the selected and known corresponding image on the microform. This provides an expedient way to preposition the microform carrier to that area indicated on the roller index, so that the image will be immediately projected onto the viewing screen.

The concept of providing an indexing means for indicating X and Y coordinate positions of surfaces to be worked is also applicable in those areas where it is desirable to move a working part to a specific location of a material surface wherein the area or surface portion represented by the coordinates is remotely observable on the indexing means. Additionally, it is within the concept of the present invention to provide structure having similar drive means whereby travel of one part moves the drive means to rotate the indexing roller 50 and thus provide an indication of the working part position in relation to the material surface being worked. While the drawings and the description relate specifically to an indexing roller and drive means therefor in the manner of indicating column and row positions of microform images, it is within the scope of the present invention that a material surface to be worked may be substituted for the microform 26, and a working part may be substituted for the projection lens assembly 95. In this respect, the material surface to be worked may be in the form of a map, a drawing on a drafting board, or even material which is placed in a machine or the like, and the working part may be in the form of a pointer or scribe, an element of a drafting machine, or a machine tool or the like. Either the working part or the material surface could be movable in relation to the other for the purpose of actuating the drive means, upon movement of one part, to rotate the indexing roller 50 and to indicate the corresponding X and Y coordinate positions thereon.

It is thus seen that herein shown and described is an indexing means for indicating column and row positions of microform images, the indexing means working with movement of the microform carrier to provide rapid accessibility to information on the microform, and which indexing means accomplishes all the objects and advantages as mentioned above. While several embodiments have been disclosed, certain variations thereon may occur to those skilled in the art, so it is contemplated that all such variations having these features are within the scope of the invention.

What is claimed is:

1. In a microform reader having a microform image carrier movable in fore-and-aft and side-to-side directions, a projection lens assembly, a screen for displaying an enlargement of a selected image of the microform, and indexing means for indicating the image being projected and displayed on the screen, said indexing means comprising drive means including a timing belt and cooperating pulleys positioned adjacent said image carrier, said belt being securely connected via a link to the microform carrier and movable in response to fore-and-aft travel thereof, and cylindrical roller means connected to the timing belt and rotatable thereby, the roller means having column and row designations thereon representing and corresponding to the images on the microform, said drive means including a hub driven by said timing belt, and the roller means and the hub including a tooth-and-slot connection for maintaining timed relationship therebetween for insuring indication on the roller means of the selected image being projected onto the screen.

* * * * *